United States Patent
Rorabaugh et al.

[11] Patent Number: 5,958,583
[45] Date of Patent: Sep. 28, 1999

[54] ALUMINA-BASED PROTECTIVE COATING FOR CERAMIC MATERIALS

[75] Inventors: Michael E. Rorabaugh, Seattle; Charles W. Newquist, Issaquah; Juris Verzemnieks, Tacoma, all of Wash.

[73] Assignee: The Boeing Company, Seattle, Wash.

[21] Appl. No.: 08/771,630

[22] Filed: Dec. 20, 1996

[51] Int. Cl.$^6$ .................................................... B32B 17/00
[52] U.S. Cl. .......................... 428/365; 428/375; 428/384; 428/396; 106/287.1; 106/287.17; 244/121; 244/133; 427/430.1
[58] Field of Search .................................. 428/325, 370, 428/365, 366, 375, 396, 384; 106/287.1, 287.17; 244/121, 133; 427/430.1

[56] References Cited

U.S. PATENT DOCUMENTS

| | | |
|---|---|---|
| H957 | 8/1991 | Borck et al. . |
| 4,442,585 | 4/1984 | McGehee, Sr. et al. . |
| 4,535,017 | 8/1985 | Kuckein et al. . |
| 4,690,851 | 9/1987 | Auduc et al. . |
| 4,767,656 | 8/1988 | Chee et al. . |
| 4,943,465 | 7/1990 | Bailey et al. . |
| 5,041,321 | 8/1991 | Bendig . |
| 5,154,373 | 10/1992 | Scott . |
| 5,198,282 | 3/1993 | Baker et al. . |
| 5,244,727 | 9/1993 | Shibata et al. . |
| 5,304,408 | 4/1994 | Jarosz et al. . |
| 5,376,598 | 12/1994 | Preedy et al. . |
| 5,441,682 | 8/1995 | Baker et al. . |
| 5,451,448 | 9/1995 | Sawko et al. . |
| 5,514,474 | 5/1996 | Morgan et al. . |
| 5,654,060 | 8/1997 | Holman et al. . |

OTHER PUBLICATIONS

Shaw, et al., "$Al_2O_3$ Coatings as Diffusion Barriers Deposited from Particulae–Containing Sol–Gel Solutions," Journal of the American Ceramic Society, Dec. 95, p. 3376.

*Primary Examiner*—Timothy Speer
*Attorney, Agent, or Firm*—John C. Hammar

[57] ABSTRACT

A coated ceramic has alumina as an amorphous residue from an alumina sol containing alumina powder or and, optionally, a high emittance powder. The alumina powder alters the rheology and wetting characteristics of the sol to aid in forming the residue and increases the alumina concentration (% solids) in the residue. The high emittance powder radiates heat out of the residue and away from the ceramic when the coated ceramic is heated, such as during orbital reentry.

20 Claims, 3 Drawing Sheets

| AREA | SURFACE TEMPERATURE °F | |
|---|---|---|
| I |  | 700 TO 1000 |
| II |  | 1000 TO 1600 |
| III |  | 1600 TO 2000 |
| IV |  | > 2000 |
|  |  | NOT PART OF STUDY |

| AREA | SURFACE TEMPERATURE °F | |
|---|---|---|
| I | ☐ | 700 TO 1000 |
| II | ▨ | 1000 TO 1600 |
| III | ▦ | 1600 TO 2000 |
| IV | ▩ | 2000 |
| | ☐ | NOT PART OF STUDY |

ALUMINA-BASED PROTECTIVE COATING FOR CERAMIC MATERIALS

TECHNICAL FIELD

The present invention relates to an alumina protective coating applied to ceramic fibers in an insulation blanket using an alumina sol to provide an amorphous alumina residue on the fiber surface containing alumina powder and, optionally, a high emittance additive. The insulation blanket is usable as a heat shield for spacecraft and the like.

BACKGROUND OF THE INVENTION

Thermal protection (i.e., heat shields) for reentry vehicles, such as the Space Shuttle or the Reusable Launch Vehicle, traditionally assembled of ceramic tiles over the vehicle surface. The tiles are of relatively small area to fit the compound curves and are costly to fabricate and to bond or fasten to the surface. Upon reentry, tiles often are damaged which results in a labor-intensive, timeconsuming replacement operation. With the goal of quick turnaround for reuse of spacecraft, tiles are ineffective.

Insulating blankets made from ceramic fibers show promise, but they are used sparingly because traditional blankets made entirely from silica quickly deteriorate upon exposure to high temperatures in an oxidative environment. The blankets are initially flexible and are relatively easy to apply, but they rapidly become brittle. The lack of toughness caused by embrittlement makes the blankets susceptible to damage and forces their replacement. These silica blankets have a reuse temperature of only about 1200° F. Replacing a blanket requires destroying the original blanket to remove it from the spacecraft surface, cleaning the spacecraft surface to prepare the surface for rebonding a new blanket, fabricating a replacement blanket, and positioning and adhesively bonding the replacement blanket to the surface. The delay associated with the curing of the traditional RTV silicone adhesive is up to seven days, which is unacceptable for a reusable launch vehicle where rapid turnaround is necessary for economic success.

Silica coated blankets have also been tried, but they have achieved limited success. Silica coatings are incompatible with many high temperature ceramics, including alumina, aluminosilicate, or aluminoborosilicate (e.g., Nextel), so the silica approach has only limited applicability.

Today, coated blankets must be able to withstand reentry temperatures of at least 1800–2300° F. while remaining tough and flexible. The blankets should be fastenable to the surface and removable, somewhat like conventional access panels, for servicing the vehicle or for quick replacement of the insulation when it becomes damaged. Therefore, a coating solution for the blanket fibers must retain the flexibility of the fabric while deterring embrittlement upon exposure to temperatures in the 2000° F. range.

SUMMARY OF THE INVENTION

The present invention is a coated insulating blanket, especially one made from alumina, aluminosilicate, or aluminoborosilicate fibers, having an amorphous alumina surface residue. The residue is applied by contacting the fibers or a fabric made from the fibers with an alumina sol of the Yoldas-type, but thickened to enhance the alumina content and to stabilize the sol by adding fumed alumina (13 nm particulate). The alumina powder alters the rheology and wetting characteristics of the sol to aid in forming the residue and increases the alumina concentration (% solids) in the residue. The residue usually includes a high emittance powder, such as a boride or silicide, to enhance radiative cooling from the residue (and blanket), thereby to keep the blanket temperature as low as possible. The sol is sprayable to simplify its application. The blanket may be quilted or of tailorable angle interlock construction.

DETAILED DESCRIPTION

Figure 1:
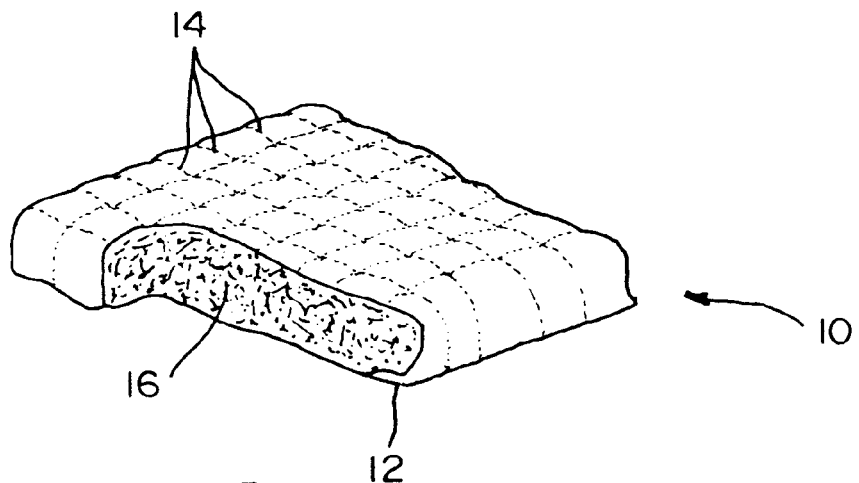
FIG. 1 shows a typical quilted insulating blanket of the present invention.

The present invention uses an alumina sol to form a thermal protection coating on ceramic fibers woven into a flexible insulation blanket for modern spacecraft. This sol is a molecular dispersion of organometallic precursors which we generally thicken to increase the alumina content by adding fine particulate alumina resulting in a mixture having up to about 30 wt % alumina. The particulate alumina modifies the rheology and wetting characteristics of the sol, stabilizing the sol. The thickened sol produces a coating that shrinks less and that is less susceptible to cracking. The alumina sol penetrates Nextel fibrous materials and leaves an amorphous (glassy) alumina protective residue on the surface after heat treatment of the sol to above about 600° F. If the sol also is loaded with high emittance powder, the surface coating radiates energy during reentry and keeps material temperatures lower. Penetration of the coating into the Nextel is controlled by the particle size of the powder and the rheology (viscosity) of the mixture.

The fine alumina particulate increases the viscosity (i.e. thickens) of the mixed solution and gives more body to the dried residue. Increasing the viscosity will reduce the settling rate of the high emittance powders and will reduce penetration of the sol into the insulating blanket. The alumina powder preferably is a fumed alumina (Oxide C, from Degussa) with particle size on the order of 13 nm.

High emittance powders can include various borides and silicides. Silicides have the potential of oxidizing to generate silica which can be detrimental to the Nextel. Borides also have the potential to oxidize and damage the Nextel. Reactivity with the fibers may be minimized by providing a relative abundance of alumina. Various oxides and carbides also serve to increase emittance. Oxides of iron, cobalt, aluminum, and chromium are used in commercial coatings from ZYP Coatings, Inc. Zinc and magnesium oxides and zinc titanate are used for space applications in coatings from a variety of sources. Silicon carbide was used with rigid insulating bricks to increase the emittance in the event of loss of the coating. Blackglas™ (Allied Signal) is a candidate high-emittance additive. High-temperature durability and compatibility of these materials and catalytic behavior must be determined from other sources. Any of these high emittance additives used with our alumina based binder. Preparation of the basic sol is described in U.S. Pat. No. 4,614,673 or Yoldas, "Alumina Sol Preparation from Alkoxides," Ceramic Bulletin, vol. 54, No. 3, pp. 289–290, 1975, which we incorporate by reference. We add fumed alumina and the emittance powder to the sol after its mixing. While we prefer the Yoldas makeup, the sol might be made in other ways, as those of ordinary skill will understand.

EXAMPLES

Table 1 summarizes results observed comparing a variety of commercial rigidizers/hardeners to the alumina sol of the present invention. Evaluation of samples after heat treatment show that all the silicate binders and the commercial aluminum phosphate binder embrittled a Nextel 440 fabric used as the common substrate. One of the commercial alumina binders failed to become stable in water even after moderate (>600° F.) heat treatment. The other two commercial alumina-based binders also weakened Nextel 440 after exposure to 2200° F.

TABLE 1

| MATERIAL | MANUFACTURER | DRAWBACK | CHEMISTRY | SAMPLE |
|---|---|---|---|---|
| Fiberfrax Rigidizer | Carborundum | Embrittles Nextel | Si, Cl | 18, 19 |
| Cotronics Hardener | Coltronics | Embrittles Nextel | Si, K | 13 |
| Thinning Fluid | Sauereisen | Embrittles Nextel | Si, B | 14 |
| Z-93P Binder | IITRI | Embrittles Nextel | Si, K | 23 |
| Nyacol Colloidal SiO | AKZO NOBEL | Embrittles Nextel | Si | 27-2c |
| ZO Mod Black (binder) | ZYP | Embrittles Nextel | Al, P | 25 |
| Dispal $Al_2O_3$ 11N7-12 | Vista | Not water resistant | Al | 9 |
| Dispal $Al_2O_3$ 23N4-20 | Vista | Particulate dispersion | Al | 10 |
| Nyacol colloidal $Al_2O_3$ | PQ | Particulate dispersion | Al | 2 |
| Rigidizer/Hardener | Zircar | Loose fabric after 2200° F. | not tested | 15 |
| Boeing $Al_2O_3$ sol | Boeing | Marginal adhesion | Al | 31 |

1. EDX analysis using a scanning electron microscope

The eleven examples that follow describe results for variations of the desired coating. Examples 1–5 include emittance data measured at AZTechnologies showing that the coating is capable of dissipating energy acquired in aerodynamic, convective heating. Examples 6, 7, and 8 describe preliminary tests leading to the larger scale test of Example 9. Example 10 demonstrates good adhesion of the coating after exposure to high temperatures. Example 11 uses an oxide additive to increase emittance and increase the viscosity of the mix.

Examples 1 and 2

Sample #'s 8 and 30

Alumina sol was used to saturate portions of a Nextel 440 fabric. The samples were heat treated to >600° F. Sample #8 was exposed to about 2200° F. and remained tough and flexible. Some loss of binder occurred with extreme flexing. Absolute emittance of sample #30 over the 2–30 μm wavelength range was determined to be 0.848.

Examples 3 and 4

Sample #'s 29-1 and 29

Alumina sol and fumed alumina powder (17:3 ratio by weight) were mixed. The resulting solution was used to saturate portions of Nextel 440. The samples were heat treated to >600° F. Sample #29-1 was exposed to about 2200° F. and remained tough and flexible. Some loss of binder occurred with extreme flexing. Absolute emittance of sample #29 over the 2–30 μm wavelength range was determined to be 0.879.

Example 5

Sample #28-3

Alumina sol, fumed alumina, and silicon carbide (from Carborundum, −600 mesh) (in the weight ratio 20:2:1) were mixed. The resulting solution was used to saturate a portion of Nextel 440 fabric. The sample was heat treated to >600° F. Absolute emittance of sample #28-3 over the 2–30 μm wavelength range was determined to be 0.884.

Example 6

Sample #32

Alumina sol, fumed alumina, and silicon tetraboride (Cerac, −200 mesh) (20:2:1 ratio by weight) were mixed. The resulting solution was used to saturate a portion of NEXTEL 440 fabric. The sample was exposed to 2200° F. and became brittle. Oxidation of the silicon tetraboride is believed to have provided sufficient silica and boria to destroy the flexibility of the Nextel fibers.

Example 7

Sample #40A

Alumina sol and fumed alumina (10:1 ratio by weight) were mixed and used to saturate a portion of Nextel cloth. The sample was heat treated to >600° F. Alumina sol, fumed alumina, and silicon tetraboride (23:2:1 ratio by weight) were mixed. The resulting solution was used to saturate the alumina treated Nextel 440 fabric. The sample was heat treated to >600° F. The sample was then heat treated to 2200° F. Evaluation showed that the sample had faded significantly and the fabric had been weakened noticeably.

Example 8

Sample #28A

Alumina sol, fumed alumina, and silicon carbide (20:2:1 ratio by weight) were mixed. Two applications of the mixture were applied to Nextel 440 fabric. The sample was heated to 2200° F. and remained flexible.

Example 9

Blanket #22, Coating Mix #31

Alumina sol, fumed alumina, and silicon carbide (16:4:1 ratio by weight) were mixed. Two applications of the mixture were applied to Nextel 440 fabric surface of a sample insulating blanket. The fabric was heated in an arc-jet test at NASA Ames facility. Material temperature in uncoated regions may have exceeded 3000° F. as evidenced by molted Nextel fibers. The coating changed from gray to almost white in some regions of the blanket, but the blanket remained intact. Subsequent vibroacoustic testing resulted in no apparent degradation to the surface of the sample. There was minor coating loss which occurred at the edges which can be associated with forcing the blanket into the test fixturing. The coating was also applied to a braided Nextel cord used to hold the blanket to an aluminum backplate. Following the arc-jet test, the braided cord was stressed to the point of flaking off most of the coating but remained intact.

For comparison, an unprotected braided cord in the same test broke with a small amount of flexing. Another braided cord in similar position which was coated for protection with a NASA coating called PCC easily broke before it could be removed from the blanket for testing.

Example 10

Sample #55

Alumina sol, fumed alumina, and silicon carbide (20:2:1 ratio by weight) were mixed. The resulting solution was used to saturate a portion of Nextel 440 fabric. The sample was exposed to 2200° F. and the mechanical properties were evaluated by hand. The fabric could be pulled hard and lightly flexed with no significant damage. The sample broke when trying to form a sharp bend. The coating had sufficient adhesion and cohesion to concentrate flexure stress and cause the fibers to fail.

Example 11

Sample #44

Alumina sol, fumed alumina, and MgO (17.6:4:2 ratio by weight) were mixed. Hydrolysis of the MgO resulted in a high pH and gelled the sol. After vigorous mixing and addition of water, the thick mixture was applied to the sample by smearing in place with a brush. Although MgO is used in high emittance paints, a sample subjected to arc-jet conditions appeared to get hotter than a corresponding mixture that contained SiC.

The protective coating is not always well bonded after initial application and curing to about 600° F. For Example 10, the coating was well bonded after high temperature exposure. Calcium aluminate and aluminum phosphate chemistries are used in low temperature setting cements. To improve bonding at low temperature, phosphoric acid was added to the sol to yield an aluminum phosphate after curing. Some fibers degraded during 2200° F. exposure apparently because of the presence of phosphates, so adding cement did not provide a benefit.

Silicon carbide has been added to several commercial cements and thin layers sprayed onto small Nextel fabric samples. Dilution of cements to a level at which they could be sprayed was not ideal. Even under those circumstances, an adhesive coating was obtained with some cements. The coating, however, was not bonded any better than the Boeing sol and hardly at all in some cases. Because part of the active ingredient in the cement is particulate matter, little penetration and toughening of the skin occurred. The chemistry of some commercial cements had the same adverse effects as the commercial hardener solutions.

The preferred manner to apply the coating is by spraying. Samples for arc-jet and vibroacoustic tests have been prepared by spraying using a gravity feed spray painting gun (Binks 630). Small coupons have been sprayed using a small air brush (Badger 250). In these tests a coated insulating blanket of the present invention was exposed to temperatures above 2200° F. and vibroacoustic testing at 165 dB. The test samples retained their integrity. Thickening the coating mix, as in example 11, could yield a paste which could be trowelled in position on the fabric to produce a smooth surface.

Figure 2:
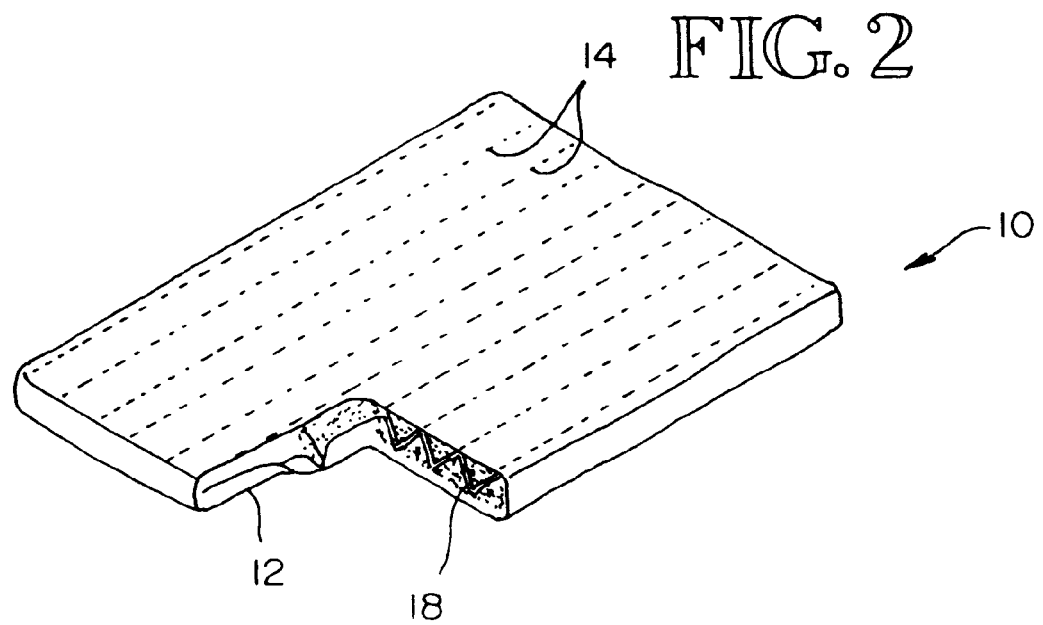
FIG. 2 shows a typical angle interlock insulating blanket of the present invention.
Figure 3:
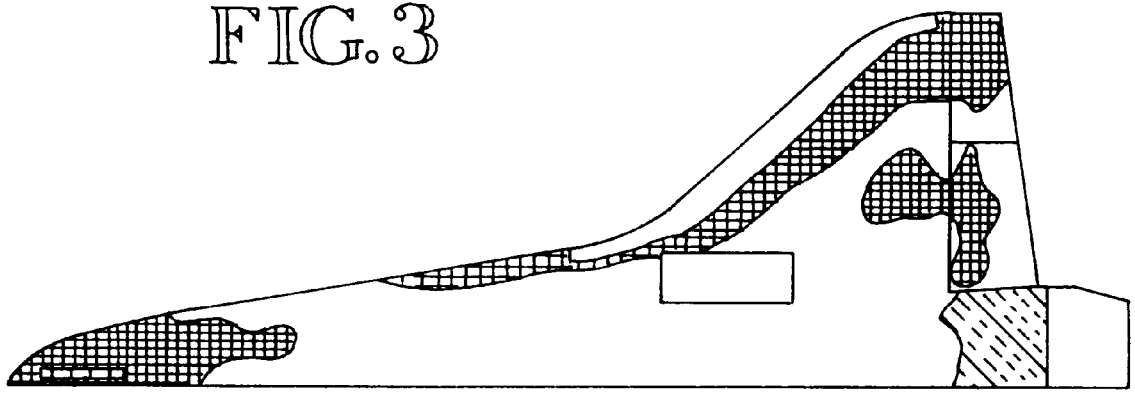
FIG. 3 is a lower surface view illustrating the surface temperature of the Space Shuttle following reentry, showing hot spots on the upper surface where insulating blankets are used.
Figure 4:
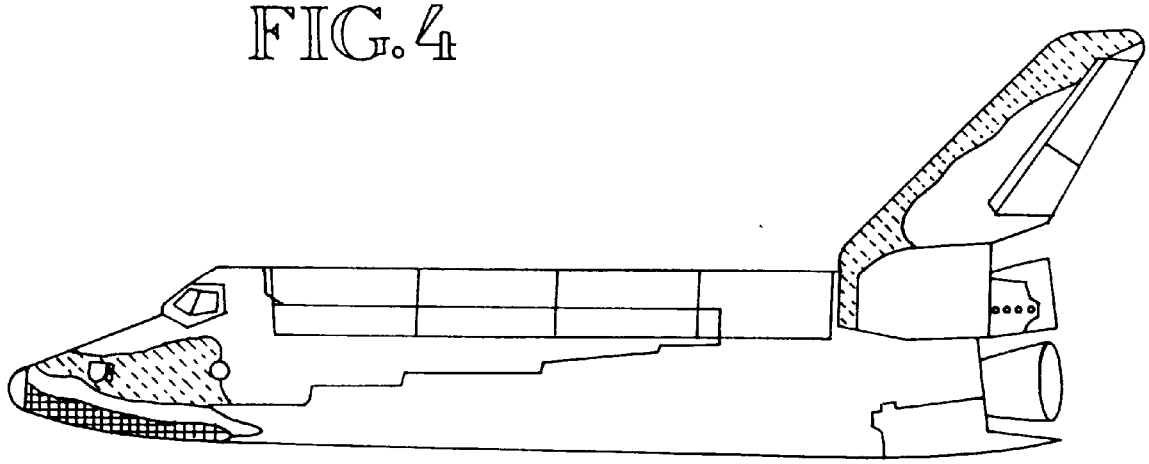
FIG. 4 is a side surface view, similar to FIG. 2, illustrating the surface temperature of the Space Shuttle following reentry.

As shown in FIG. 1, a preferred, quilted insulating blanket 10 comprises an outer Nextel fabric 12 stitched with Nextel thread 14 into quilted sections holding alumina batting 16. The batting might also be silica, mixtures of alumina and silica, an alumina silica-alumina layered material, or other ceramic fibers as the temperature requirements dictate. Quilted blankets can easily be prepared in different thicknesses and with different quilting patterns. An angle interlock embodiment is shown in FIG. 2. This embodiment has a smoother surface texture for the Nextel fabric with outer mold line ripples occurring only in one direction because the inner corrugated batting 18 is stiched to the outer Nextel fabric in unidirectional seams. The quilted insulating blanket generally has lower thermal conductivity than the angled interlock insulating blanket because the quilted blanket lacks conduction paths formed with the corrugations of the angle interlock embodiment.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

We claim:

1. A coated ceramic suitable for use as a flexible insulating blanket at temperatures at least about 1800–2300° F. comprising:
   (a) a ceramic substrate;
   (b) an alumina surface coating on the substrate, wherein the coating is formed by applying a sol to the substrate to produce an amorphous alumina residue;
   (c) an effective amount of alumina powder in the coating being added to the sol to thicken and to stabilize the sol and to improve wetting of the sol on the substrate;
   (d) optionally, an effective amount of cement in the coating added to the sol to improve bonding between the coating and the substrate; and
   (e) optionally, a high emittance powder carried in the sol to radiate heat from the coating.

2. The coated ceramic of claim 1 wherein the substrate is an alumina, aluminosilicate, or aluminoborosilicate.

3. The coated ceramic of claim 1 wherein the substrate is a woven fabric of fibers.

4. The coated ceramic of claim 2 wherein the substrate is a woven fabric of fibers.

5. The coated ceramic of claim 1 wherein the high emittance powder is boride, silicide, iron oxide, cobalt oxide, chromia, alumina, zinc oxide, magnesium oxide, zinc titanate, silicon carbide, or mixtures thereof.

6. A spececraft having a quilted insulating blanket as a heat shield, the heat shield including a coated ceramic as defined in claim 1 as an outer layer and alumina batting as an inner layer.

7. The spacecraft of claim 6 wherein cement is included.

8. The spacecraft of claim 6 wherein a high emittance powder is included.

9. The spacecraft of claim 6 wherein both cement and a high emittance powder are included.

10. The spacecraft of claim 9 wherein the substrate is an alumina, aluminosilicate, or aluminoborosilicate, wherein the substrate includes woven fiber, and wherein the high emittance powder is boride, silicide, iron oxide, cobalt oxide, chromia, alumina, zinc oxide, magnesium oxide, zinc titanate, silicon carbide, or mixtures thereof.

11. The coated ceramic of claim 1 wherein cement is included.

12. The coated ceramic of claim 1 wherein a high emittance powder is included.

13. The coated ceramic of claim 1 wherein both cement and a high emittance powder are included.

14. An alumina sol for coating alumina, aluminosilicate, or aluminoborosilicate fibers to protect the fibers from becoming brittle when exposed to an oxidative atmosphere at elevated temperatures, comprising:

(a) a molecular dispersion of alumina in an aqueous carrier;

(b) a high emittance powder in the carrier to thicken the sol to improve its application and to provide radiation of thermal energy at elevated temperatures; and (c) alumina powder for thickening the sol to improve its wetting of the fibers.

15. The sol of claim 14 wherein the powder has a particle size of about 13 nm.

16. A method for preventing embrittlement of aluminoborosilicate fibers when exposed to elevated temperatures in an oxidative atmosphere, comprising the steps of:

(a) coating the fibers with an alumina surface coating by exposing the fibers to an alumina sol;

(b) optionally, adding alumina powder to the sol to form a sol—powder mixture for thickening the sol to improve wetting of the fibers with the sol—powder mixture and for increasing the concentration of alumina in the coating; and (c) optionally, adding a high emittance powder in the sol so that the coating radiates heat quickly when the coated fiber is heated.

17. The method of claim 16 wherein the alumina surface coating contains an effective amount of a cement for improving bonding of the coating to the fibers.

18. The method of claim 16 wherein alumina powder is added.

19. The method of claim 16 wherein the high emittance powder is added.

20. The method of claim 16 wherein both alumina powder and the high emittance powder are added.

\* \* \* \* \*